Mar. 13, 1923.
J. P. SNEDDON.
FURNACE.
FILED NOV. 4, 1921.
1,448,160.
2 SHEETS—SHEET 1.
FIG.1.
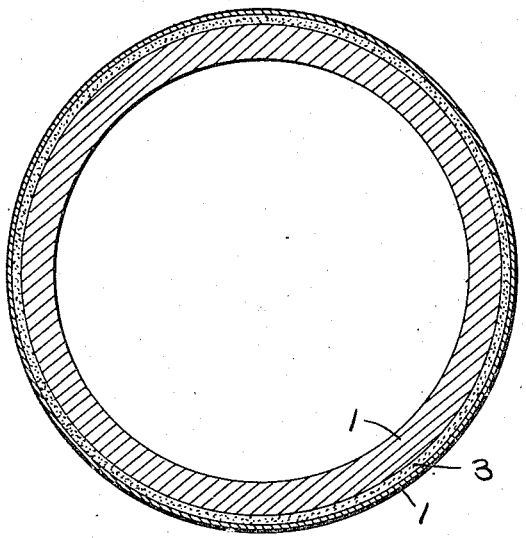
FIG.2.
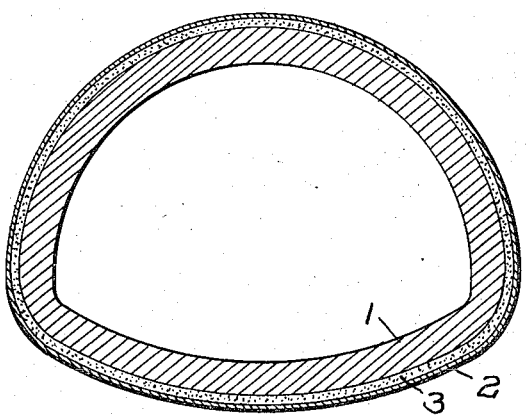
FIG.3.
FIG.4.
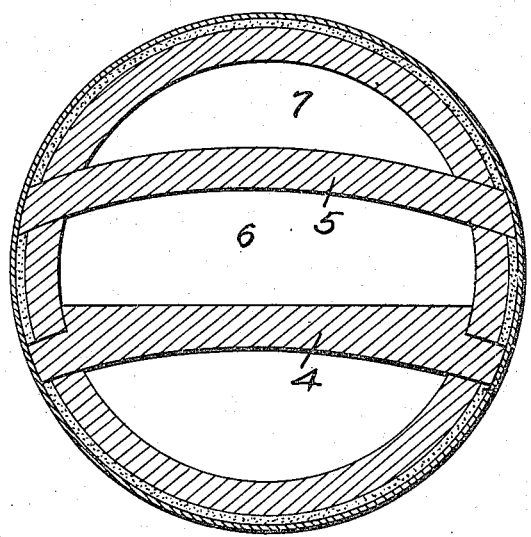
FIG.5.
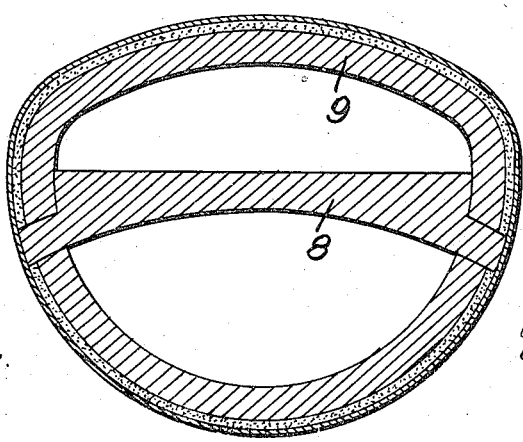
WITNESSES
J. Herbert Bradley
INVENTOR
James Stuart Sneddon
and
Edward R. Stettinius
Executors of
James P. Sneddon
deceased.
By Winter & Brown
attys

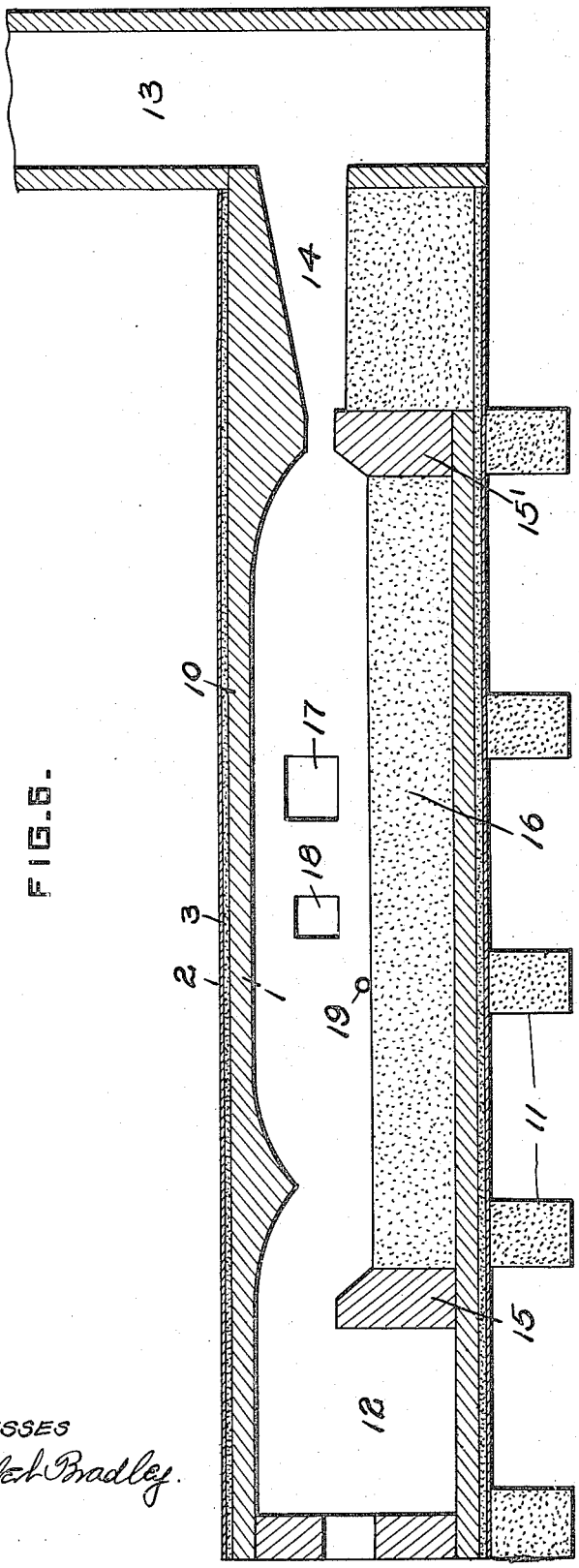

Patented Mar. 13, 1923.

1,448,160

UNITED STATES PATENT OFFICE.

JAMES P. SNEDDON, DECEASED, LATE OF BAYONNE, NEW JERSEY, BY JAMES STUART SNEDDON, OF BAYONNE, NEW JERSEY, AND EDWARD R. STETTINIUS, OF NEW YORK, N. Y., EXECUTORS, ASSIGNORS TO PITTSBURGH SEAMLESS TUBE COMPANY, OF BEAVER FALLS, PENNSYLVANIA, A CORPORATION OF PENNSYLVANIA.

FURNACE.

Application filed November 4, 1921. Serial No. 512,950.

*To all whom it may concern:*

Be it known that JAMES P. SNEDDON, deceased, late a citizen of the United States, resident of Bayonne, in the county of Hudson and State of New Jersey, has invented a new and useful Furnace, of which the following is a specification.

The invention relates to stationary horizontal or approximately horizontal industrial furnaces and ovens of various kinds, such as annealing furnaces for steel products, metal heating furnaces for forging, rolling and tube mill work, metal refining furnaces, reverberatory furnaces, open hearth furnaces, roasting furnaces, malleable iron furnaces, soaking pit furnaces, glass melting tanks, glass annealing furnaces, by-product coke furnaces, and other similar industrial heating furnaces or ovens which ordinarily are built of refractory brick or blocks to provide a heating chamber comprising a hearth or floor, side walls, and a roof or crown.

Heretofore, furnaces and ovens of the character described have been of substantially rectangular cross-section, built of refractory brick or blocks and comprising vertical side walls and an arched crown or roof sprung between or on top of the side walls, and of such size that the resulting stresses required that their walls be thick and held together by various arrangements of buck stays and tie bolts, skew-backs, or suspended metallic arch hangers or supports. When such furnaces or ovens, built according to the usual practice, are fired or heated up, the refractory lining expands, the joints open up and the bricks crack, thus exposing larger areas of the refractory brick or blocks for the absorption of heat, with the result that the refractory lining disintegrates or burns out, the roof or crown rapidly weakens and collapses, and the side walls become cracked and open at the joints with a resultant large loss or dissipation of heat. Furthermore, the expansion of the refractory lining makes it necessary to loosen the tie rods in order to prevent the buck stays or tie rods from breaking or the wall from collapsing. Furthermore, this prior construction requires such thickness of wall and roof or crown and such heavy and strong buck stays, tie rods, and the like, in order to secure reasonable strength and durability, that the cost of construction is correspondingly high, and this together with the short life of furnaces so constructed renders them expensive. The opening up of the seams in the wall and the cracking and dropping out of the brick also renders such furnaces uneconomical in operation due to the large dissipation of heat.

The object of the present invention is to improve the construction of furnaces and ovens of the kind described and provide furnaces and ovens for the purposes named whose initial cost is considerably less than that of present designs of such furnaces and ovens but whose durability or life nevertheless is much longer, which are so constructed as to automatically take care of the expansion and contraction of the walls which occur when the furnaces are being heated up or cooled down and in which the loss of heat by radiation is reduced, thereby effecting economy in the consumption of fuel.

In the accomplishment of the foregoing objects the invention consists in furnaces and ovens of the character described comprising a stable structure formed by walls which, in lieu of being rectangular in cross section, are in the form of a circle, ellipse, or other continuous-curve form approximately a circle or ellipse, and consisting of a continuous inner wall built up of refractory brick or blocks and being under compression, and an outer continuous-curve sheet metal casing or shell surrounding the compression wall and forming a tension member which resists radial and tangential stresses due to the expansion of the compression wall, said stable structure being such as to automatically take care of the expansions and contractions which occur when the furnace is being heated up or cooled down. The invention is applicable to all furnaces and ovens of the character specified, whether of the direct heating, semi-muffled, or muffled type.

The invention will be readily understood from the following description taken together with the appended claims, and in its most comprehensive sense consists in the provision of a substantially horizontal stationary furnace of continuous-curve in cross-section forming a stable structure composed of an inner compression wall and an outer metal shell under tension.

In the accompanying drawings Fig. 1 is a transverse section through a furnace which is circular in cross-section illustrating the principle of the invention as applied thereto; Fig. 2 a transverse section through a furnace in which the hearth portion is slightly concave and whose roof is semi-circular; Fig. 3 a similar view through a furnace which is elliptical in cross section; Fig. 4 a transverse section through a furnace circular in cross-section in which arches are sprung across the same; Fig. 5 a view similar to Fig. 4 in which a single arch is used and in which the roof portion of the furnace is in the form of a flattened arc of a circle; and Fig. 6 a vertical, longitudinal sectional view of an iron casting or melting furnace embodying the invention.

In each of the forms shown illustrating the several cross-sections, 1 designates an inner wall built up of refractory material, preferably refractory brick or blocks, and comprises a compression wall encased in an outer sheet metal casing or shell 2 forming a tension member resisting radial and tangential stresses. Between the compression wall 1 and the tension member 2 is an intermediate compressible lining 3 preferably formed of a material such as magnesia which will not only act as a compressible lining but will also function as a heat insulator to prevent large losses due to dissipation thereof.

In the type shown in Fig. 4 a lower arch 4 and an upper arch 5 is sprung across the body of the furnace, both of said arches being in the form of a flattened arc of a circle, and as illustrated, the upper surface of the lower arch is flat so as to adapt the same as a supporting surface. The upper arch 5 divides the space above the arch 4 into a treating chamber 6 and a flue 7.

In the type illustrated in Fig. 5 a single arch 8 is used which is similar to arch 4 of Fig. 4, except that it is positioned somewhat higher above the bottom of the furnace, and the top or roof 9 is in the form of a flattened arc of a circle.

In each of the forms shown, the outer shell 2 acting as a tension member cooperates with the inner refractory compression wall 1 to form a stable structure.

Whenever the furnace is heated up, the wall 1 expands putting the intermediate lining 3 under greater compression, which in turn is resisted by the tension member 2. It has been found that various materials adapted to be used for the refractory lining have varying coefficients of expansion and that some even possess a negative coefficient of expansion after reaching predetermined temperatures. The use of the intermediate compressible lining 3 compensates for these various degrees and ratios of expansion, keeping the inner wall and shell in intimate contact, and assures the body constituted by the wall 1, lining 3 and tension member 2 being maintained stable at all times regardless of the degree to which the furnace is heated, and whether the same is being heated up or cooled down. Besides functioning as a means to compensate for the various degrees of expansion and to maintain a stable structure, the lining 3 also functions as a means to prevent the dissipation of heat. It is to be understood that the intermediate lining 3 is only one means of compensation which may be effected by various alternatives, the invention broadly contemplating a construction comprising an inner compression wall, an outer tension member and compensating means, all of which cooperate to form a stable structure as described.

In the types illustrated in Figs. 2 to 5 considerable radial and tangential stresses are produced, not only by expansion of the compression wall 1 itself, but due to the weight of the walls and the internal transverse arches in addition to the stresses produced by their expansion. In Figs. 2, 3 and 5, due to the fact that a portion of the wall is either elliptical or in the form of a flattened arc of a circle, and in Figs. 4 and 5, due to the fact that the arches 4, 5 and 8 are of similar shape, and also due to their lengthening caused by expansion when heated, great lateral stresses are thrown upon the outer tension member. In any case, however, the construction defined assures the stability of the structure being maintained, prevents the disintegration and burning out of the refractory wall, and reduces loss of heat due to dissipation.

The invention defined is applicable to various kinds of furnaces as above noted, Fig. 6 showing its embodiment in an iron casting furnace suitable for melting iron for malleable castings. In the embodiment, the longitudinal wall 10 is supported upon the spaced foundations 11, is provided with a combustion chamber 12 and at one end communicates with the stack 13 through the passage 14 which passage is of gradually increasing cross-section towards its point of discharge into the stack. The hearth is formed by two upright partitions 15 and 15' suitably spaced as shown, acting in conjunction with the central portion 16 of the floor of the furnace. The usual skimming door, test door and tapping orifice are provided in the side wall, being respectively indicated at 17, 18 and 19.

Some of the advantages flowing from the invention and which are of great practical importance are the provision of a stable structure, free from the disadvantages previously noted; reduction in the quantity of material required in the original construction with a corresponding decrease in the cost of material and labor for installation; decreased cost of repair and replacement; the elimination of the usual expensive skewbacks and buck stays, together with their disadvantages; increased comfort and economy due to the confinement of heat; increased life of the furnace; and reduction in weight of the furnace, permitting the use of lighter and spaced apart foundations for supporting the same.

We claim:

1. A stationary substantially horizontal furnace or oven comprising a stable continuous-curve inner wall of refractory material as a compression member, an outer metal shell for maintaining the inner wall constantly under compression and resisting stresses due to expansion thereof and means for permitting unequal ratios of expansion of the two walls while maintaining said compression.

2. A stationary substantially horizontal furnace or oven comprising a stable continuous-curve inner wall of refractory material as a compression member and an outer metal shell for maintaining the inner wall constantly under compression and resisting stresses due to expansion thereof and an intermediate cushioning layer permitting unequal expansion of the walls without destroying the compression.

3. A stationary substantially horizontal furnace or oven comprising a stable continuous-curve inner wall of refractory material as a compression member and an outer metal shell for maintaining the inner wall constantly under compression and resisting stresses due to expansion thereof, and an intermediate cushioning layer of heat insulating material permitting unequal expansion of the walls without destroying the compression.

4. A stationary substantially horizontal furnace or oven comprising a stable continuous-curve inner wall of refractory material under compression, and an outer metal shell for maintaining the inner wall constantly under compression and resisting stresses due to expansion and contraction thereof, and an intermediate cushioning layer permitting unequal expansion of the walls without destroying the compression.

5. A stationary substantially horizontal furnace or oven comprising a stable continuous-curve inner wall of refractory material under compression and an outer metal shell for maintaining the inner wall constantly under compression and resisting stresses due to expansion thereof, and an intermediate cushioning layer of heat insulating material permitting unequal expansion of the walls without destroying the compression.

In testimony whereof, we sign our names.

JAMES STUART SNEDDON,
EDWARD R. STETTINIUS,
*Executors of James P. Sneddon, deceased.*